United States Patent [19]
Kern

[11] Patent Number: 4,975,888
[45] Date of Patent: Dec. 4, 1990

[54] MINE NEUTRALIZATION SYSTEM

[75] Inventor: George E. Kern, Monrovia, Calif.

[73] Assignee: The United States of America as represented by the Secretary of the Navy, Washington, D.C.

[21] Appl. No.: 626,656

[22] Filed: Mar. 22, 1967

[51] Int. Cl.⁵ .............................................. 601S 15/00
[52] U.S. Cl. ..................................... 367/96; 267/106; 114/245
[58] Field of Search .................. 340/3, 3 T; 89/1.809, 89/1.81, 5; 114/235, 242, 245, 253, 316; 367/106, 96; 102/390, 206, 427

[56] References Cited

U.S. PATENT DOCUMENTS 1,344,074  6/1920  Williams .............................. 114/244
2,769,966 11/1956  Rines ..................................... 367/96

Primary Examiner—Thomas H. Tarcza
Assistant Examiner—Daniel T. Pihulic
Attorney, Agent, or Firm—Harvey David; John Becker; Sol Sheinbein

[57] ABSTRACT

A mine neutralization system having self-propelled explosive charges fired at submarine mines by a mine detection and fire control system.

10 Claims, 2 Drawing Sheets

MINE NEUTRALIZATION SYSTEM

The present invention relates generally to sea mine sweeping and neutralization systems, and, in particular, is a system for neutralizing bottom-type sea mines.

In the past, numerous methods and means have been employed for the sweeping and neutralizing of submarine mines. For example, noise generators have been used to sonify a predetermined volume of water through which ship or other vehicle navigation is intended. So doing, of course, applies acoustical energy of such strength and frequency to mines located therein to cause those mines responsive thereto to be detonated in a harmless manner. Another example is a system that includes the use of divers who locate and either detonate or disable submarine mines. Still another example is the use of pressure mine sweeping devices for the detonation of particular pressure signature or pattern responsive sea mines. Other examples, such as electrochemical mine destruction means and the simple pattern-dropping of depth charges in known submarine mine fields, have also been employed for mine neutralization purposes.

Although all of the aforementioned prior art mine neutralization and defense systems may be adequate for some particular purpose during some particular tactical maneuver, it has been found that they each leave something to be desired, in that they are either not as reliable as desired or that the employment thereof involves considerable danger to the mine sweeping and neutralization personnel and equipment.

The present system is a more sophisticated approach to the mine neutralization problem and seems to be an improvement over the prior art, in that it is more reliable, more effective, and considerably safer to operate.

It is, therefore, an object of this invention to provide an improved method and means for neutralizing submarine mines.

Still another object of this invention is to provide an improved method and means for locating bottom-type sea mines and destroying them without undue hazzard or vulnerability to mine neutralizing personnel and equipment.

Other objects and many of the attendant advantages will be readily appreciated as the subject invention becomes better understood by reference to the following detailed description, when considered in conjunction with the accompanying drawings wherein.

Figure 1:
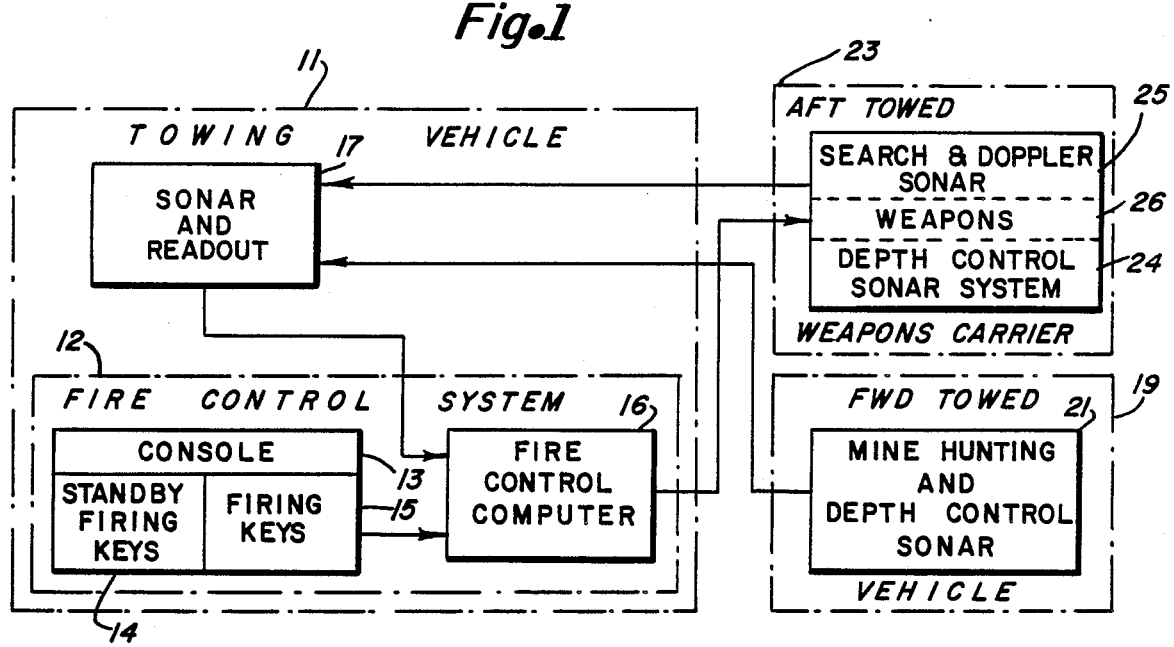
FIG. 1 is an exemplary block diagram of the system constituting this invention.
Figure 2:
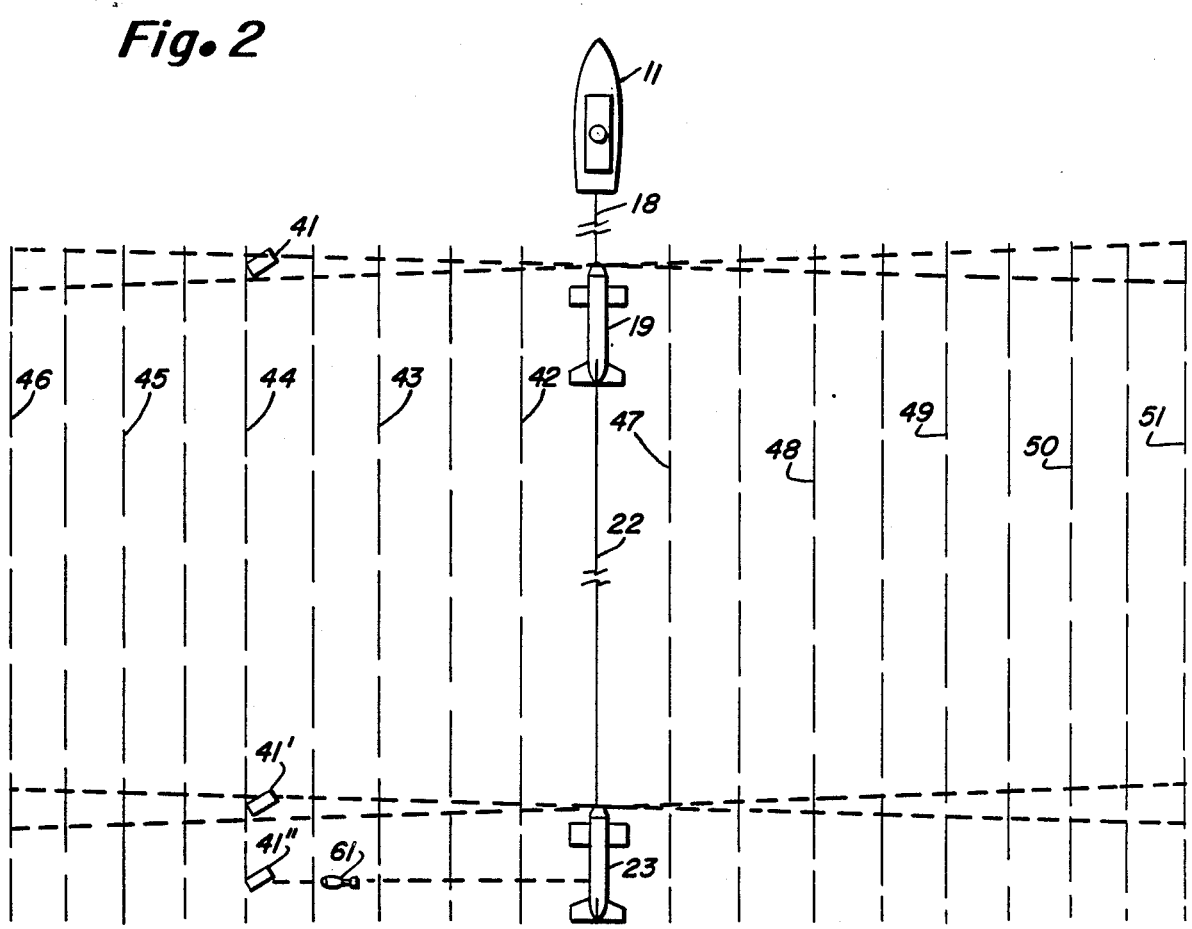
FIG. 2 is a quasi-pictorial top view of the subject mine neutralization system with zone definitions and target representations included therein.

Referring now to FIGS. 1 and 2, a block diagram of the overall system constituting this invention is shown as including a towing vehicle 11 which is preferably a conventional minesweeping type ship, to which the commonly used enemy sea mine is not ordinarily responsive. Of course, for simplicity of disclosure, a ship is herewith used as the preferred embodiment of the type of towing vehicle that may be used in the subject system, but it should be understood that any other suitable vehicle (such as, for instance, an aircraft) may be substituted therefor, if so desired.

Located on ship 11 is a fire control system 12, which includes an operator's fire control console 13 having a standby firing key panel 14 and a firing key panel 15, each of which should be so designed as to be interactive in such manner as will be discussed more fully in the explanation of the operation of the subject invention subsequently. The output of fire panel 15 is connected to a fire control computer 16 which performs the function of timely firing the proper one of the weapons for optimum effectiveness and safety.

A sonar and readout 17 is, likewise, located on ship 11 and is connected to both the aforementioned fire control console 13 and fire control computer 16 for operative cooperation therewith. Sonar and readout 17 may be a complete unit in itself, including Doppler measurement circuits for determining the speed of the towed vehicles, and, in addition, it may be so designed to be connected to sonar systems or sonar transducers located in towed vehicles yet to be described. It, of course, also contains a suitable readout means, which, may, for example, take the form of a cathode ray tube, an oscillograph, a strip chart recorder, a chemical type recorder, or the like.

Physically connected to ship 11 by a combination tow cable and electrical conductors 18 is a forward-towed submarine vehicle 19, the travel course and depth of which may be controlled from ship 11 by paying out or taking up said cable, or any other appropriate control means located on either vehicle 19 or ship 11. Forward-towed vehicle 19 preferably contains a depth control and high-resolution, side-looking, shadowgraph-type, mine hunting, detection, and classification sonar 21. This sonar, of course, includes an electroacoustical transducer disposed in the sea water in such manner that it will scan the sea floor and perform the functions indicated above. Sonar 21 is coupled to sonar 17 in such manner that the operator looking at the readout thereof sees an image similar to that seen by sonar 21 and its transducer and, thus, effectively sees the sea floor, the submerged object, or the mine, if any, that has been acquired thereby, as it is being towed in forward-towed vehicle 19.

Towed behind depth controlled forward-towed vehicle 19 by another tow cable-electrical conductor combination 22 is an aft-towed submarine weapons carrier vehicle 23. Included therein is a fathometer type depth control system 24, which may be either preset or remotely adjusted from ship 11 through sonar 17 and fire control system 12 to cause carrier vehicle 23 to travel at a predetermined altitude above the sea floor, as it hunts therealong for bottom mines. This, then, in effect, makes vehicle 23 a bottom-following vehicle.

Aft-towed vehicle 23 also includes a high-resolution, side-looking, shadowgraph type of sonar 25, which is readily capable of detecting and classifying a mine laying on the sea floor and, furthermore, which is also connected to the aforementioned sonar 17 aboard ship 11 for readout of the sea floor picture and the presence or lack of presence of said mine.

Also mounted in aft-towed vehicle 23 is a plurality of weapons 26 capable of being fired toward the proximate location of a mine, as determined by the aforesaid sonar 25.

Figure 3:
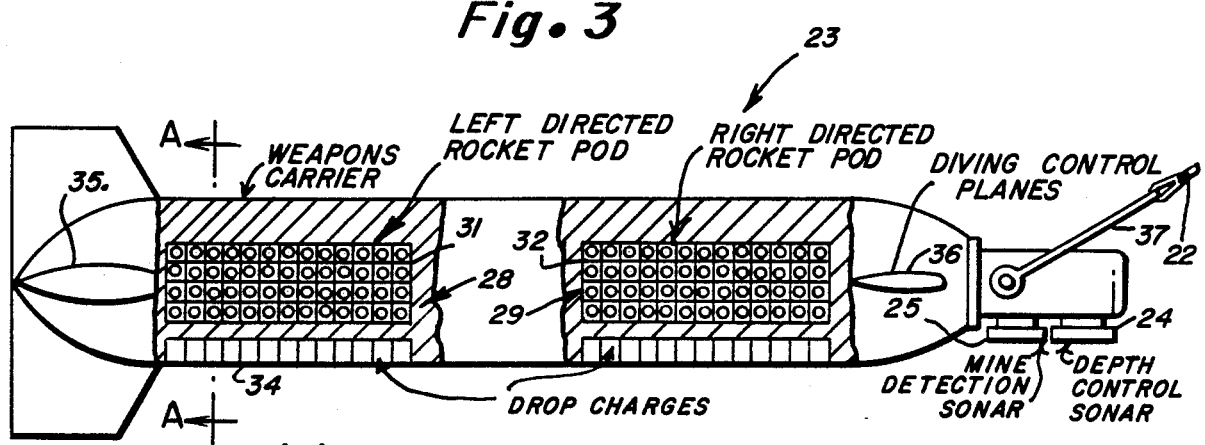
FIG. 3 is a mechanical schematic view, with parts broken away, of the weapons carrier element of this invention.
Figure 4:
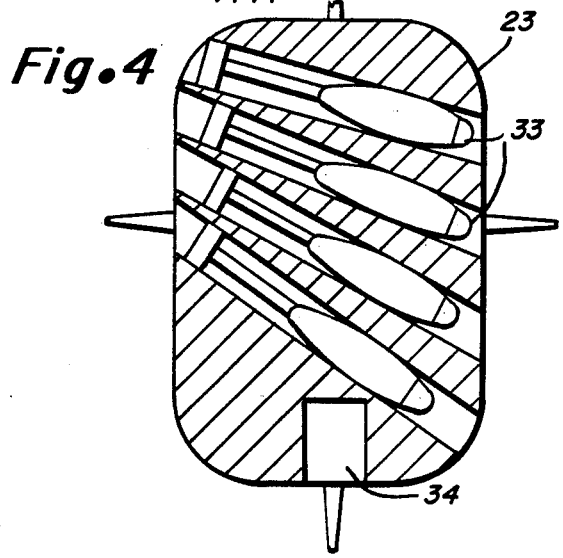
FIG. 4 is a mechanical schematic cross-section of the weapons carrier taken at A—A of FIG. 3.

The weapons and their dispositions referred to above are disclosed in greater detail in FIGS. 3 and 4. The main body 27 of vehicle 23 contains a pair of weapon pods 28 and 29, each of which contain a number of launching cells 31 and 32 arranged in rows having center axes oriented at a predetermined downward angle with the horizontal. FIG. 4, which is a cross-section taken at A—A of weapons carrier 23 of FIG. 3, shows in greater particularity the location and angular disposition of cells 31. Also shown in greater detail is a plurality of solid-propellant, underwater, ballistic-type, explosive rockets 33, which are effectively connected in such manner to the output of fire control computer 16 to be timely fired in accordance with the operator's desires (triggered keys) and the sonar and fire control system determinations.

Likewise, a plurality of drop charges 34 are disposed in the bottom of vehicle 23 and connected to the output of computer 16 for the timely dropping thereof, in event the mine to be neutralized is located directly underneath the aft-towed vehicle.

Both the aforementioned rockets 33 and drop charges 34 each contain an explosive charge which is timely detonated after the firing or dropping thereof, as the case may be. Moreover, said charges are preferably detonated only after a predetermined time delay occurs after the firing of the weapon, and this detonation time delay is preferably effected by a suitable fuze incorporated between the rocket or drop charge firing mechanism and the explosive charge contained therein.

Vehicle 23 preferably contains stabilizing fins 35 and diving control planes 36 which, of course, are part of the aforesaid weapons carrier depth control system 24. It may also be noteworthy that both underwater vehicles 19 and 23 may, if desired, contain other stabilization elements, respectively, to restrict and maintain their pitch, roll, yaw oscillations within predetermined limits. Moreover, both vehicles are preferably inherently buoyant and, thus, are either ballasted or flown at the appropriate water depths, in order to effect substantially optimum operation.

A towing bail 37 is preferably hinged to the nose section of weapons carrier 23, so as to facilitate the maneuvering thereof by tow-electrical cable 22, especially in the up and down directions.

At this time, it should perhaps be noteworthy that all of the elements of the block diagram of FIG. 1, with the exception of the weapons carrier vehicle, are well known and conventional per se. Therefore, it is to be understood that it is their unique inter-connections and interactions with each other and said weapons carrier vehicle that effects the subject invention and produces the new and improved results stated herein.

The operation of this invention will now be discussed briefly in conjunction with all of the figures of the drawing.

Referring first to FIG. 2, ship 11 is shown as towing in tandem submarine vehicles 19 and 23. The respective distances therebetween are, of course, a matter of design choice, and would be determined by the particular operational circumstances involved.

As forward towed vehicle 19 moves along its course at some preset or controlled depth, its side-looking sonar searches for mines laying on the sea floor. If, for example, a mine 41 is located by the side-looking beam pattern of said sonar, this information is conveyed to the human operator aboard ship 11 by means of the towing cable containing the electrical signal conducting wires. This information signal is actually displayed on a console by a suitable readout (such as the aforementioned chemical recorder, for instance) included in or combined with sonar 17 in such manner that the characteristic shapes of acquired bottom objects, including sea mines, can be distinguished and determined. The graphic record generated by said readout is divided into left and right zones which preferably decrease in width as they extend outwardly and sidewardly from mine hunting vehicle 19. Examples of the actual zones graphically indicated on the aforesaid record are schematically represented by the long dashed boundary lines 42 through 46 on the left side and 47 through 51 on the right side running parallel to the course of ship 11. The center of the record then represents the longitudinal axis of forward vehicle 19, and as it is being towed, a continuous picture of the bottom is being displayed at the aforementioned readout. Thus, as the forward sonar sweeps past an object such as mine 41, an indication and picture thereof will appear in one of the zones displayed by the recorder.

Assuming, for example, that mine 41 has been detected as being located in the zone bounded by extremities 43 and 44. The operator takes not of this fact, decides that the detected object is in fact a mine, and triggers a key in standby firing circuit 14, which, in turn, selects what appears at that time to be the proper weapon to be fired. If the target appears close to the boundary between two zones, the operator selects the weapon cell in the adjacent row to allow for any drift that might occur as the weapons carrier advances to the firing point.

Figure 5:
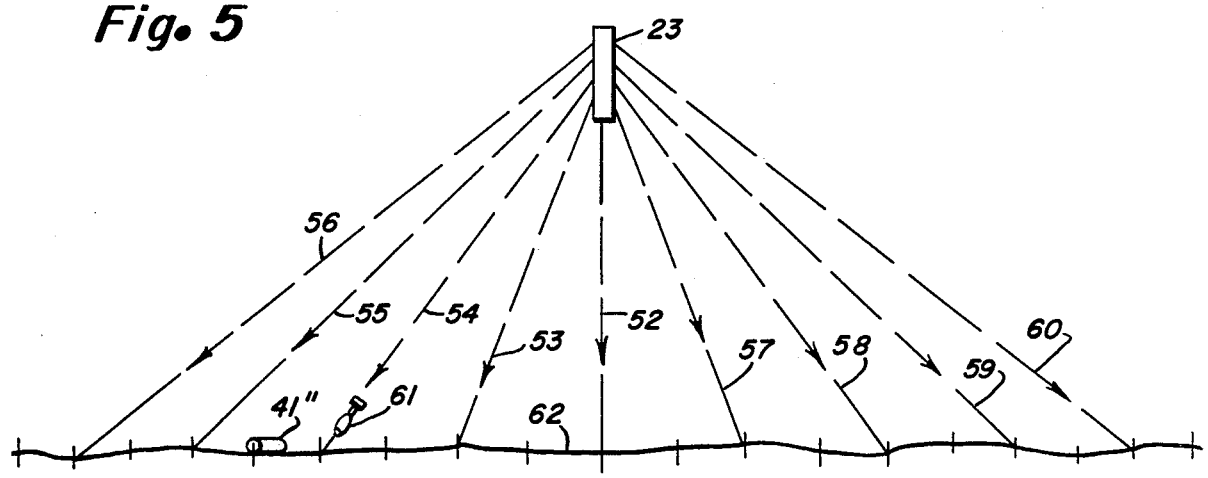
FIG. 5 is a diagrammatical view of the weapons carrier, and the rocket and drop charge trajectories effected thereby.

As is shown in FIG. 5, drop charge trajectory 52, left rocket trajectories 53 through 56, and right rocket trajectories 47 through 60 are aimed at the center of the aforementioned zones, respectively.

As the ship and two towed vehicles travel on their course, mine 41 soon crosses the sonar beam of weapons carrier 23, at which time it herewith becomes designated as mine 41' in FIG. 2. The sonar operator then knows exactly in which zone the mine is located and, thus, triggers the key of firing keys 15 that will initiate the firing of the proper weapon 61 (in this case, rocket). This action automatically de-energizes the alternate weapon cell.

Due to the aforementioned Doppler portion of the sonar, the weapons carrier effectively contains a velocity sensing means which, through sonar 17, provides continuous information to fire control computer 16 aboard the ship on the distance traveled from the time the target mine was acquired by the weapons carrier sonar. Inasmuch as the center axis (and thus the aim) of each weapon cell is located at a fixed distance from the acoustic axis of weapon carrier sonar, it is necessary to delay the completion of the firing circuit until the proper weapon is located at a position substantially abeam the target mine, now indicated as mine 41", after correction for lead angle, drift, etc. This function is automatically accomplished in the conventional manner by fire control computer 16 on board towing ship 11. After firing is completed, of course, rocket 61 is propelled through the water toward the center of the aforesaid zone of sea floor 62 in which target mine 41" lays. In due time after arrival thereat, as determined by various safety factors, it explodes in the vicinity thereof. Although, weapons carrier 23 is usually far enough away from mine 41" to not be destroyed thereby, all weapons—that is, both rockets and dropped charges—are preferably provided, as previously mentioned, with time-delay fuzes, so as to allow the weapons carrier to move to a safe distance before detonation of the weapon's explosive charge occurs.

Obviously, detonation of the weapon's charge, due to its proximity with the target mine, usually causes the mine itself to be blown up and, hence, destroyed or neutralized. However, even if this should not be the case, the shock wave from the exploding weapon will usually rupture the mine compartment containing the mine actuating mechanism, thereby causing it to become flooded with sea water. This, in turn, will damage the mine firing mechanism, which will effectively make it inoperable, and, thus, neutralized.

If so desired, after the proper weapon has been fired, both the mine and weapon may be swept by a third sonar. Then the readout thereof will display the distance between them, and the operator can scale the distance therebetween to determine if the weapon was placed within lethal distance of the mine. If the impact location exceeds the lethal distance, the mine location may be plotted on a master chart for subsequent follow-up action.

A possible variation of the foregoing system also appears to be of value in mine neutralization. In this variation, an odometric fuze located in the weapon could be set to detonate as it passes over the mine. In such case, the weapon fired would be one that is aimed at the outer boundary of each zone, instead of the center. In order to insure a high kill probability, the width of the zones are varied as previously mentioned. It has been ascertained that optimum zone width desings are determined by the angles of ballistic trajectory employed, the height above the sea floor that the weapons carrier is controlled to run, and the lethal radius of the warheads or explosive charges of the weapons. As a general rule, it has been found that the zone width should be increased as the weapon pods are towed closer to the sea bottom, if maximum accuracy is to be obtained.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sea mine neutralization system comprising in combination:
    a weapons carrier submarine vehicle;
    a plurality of rocket launching cells disposed in said weapons carrier submarine vehicle, the axes of which respectively point abeam the longitudinal axis thereof and at different angles with respect to the vertical axis thereof, so as to effectively be aimed at a like plurality of successive laterally and downwardly disposed sea floor target zones;
    a like plurality of explosive underwater rockets respectively disposed in said rocket launching cells;
    a plurality of drop-charge launching cells located in the bottom of said weapons carrier submarine vehicle;
    a like plurality of drop charges respectively disposed in said drop charge launching cells;
    means for towing said weapons carrier submarine vehicle along a predetermined course a predetermined altitude above the sea floor; and
    means effectively mounted on said weapons carrier submarine vehicle towing means and said weapons carrier submarine vehicle for selectively firing one of said rockets or drop charges when a predetermined target object is determined and indicated thereby to be laying on the sea floor within the zone at which said one rocket or drop charge is aimed.

2. The device of claim 1 wherein said like plurality of explosive underwater rockets respectively disposed in said rocket launching cells include:
    a fuze for delaying the detonation thereof for a predetermined time after the firing thereof.

3. The device of claim 1 wherein said like plurality of drop charges respectively disposed in said drop charge launching cells each include a fuze for timely delaying the detonation thereof for a predetermined time after the dropping thereof.

4. The device of claim 1 wherein said means effectively mounted on said weapons carrier submarine vehicle towing means and said weapons carrier submarine vehicle for selectively firing one of said underwater explosive rockets or drop charges when a predetermined target object is determined and indicated thereby to be laying on the sea floor within the zone at which said one underwater explosive rocket or drop charge is aimed comprises:
    a sonar and readout system; and
    a fire control system connected between an output of said sonar and readout system and the aforementioned underwater explosive rockets and drop charges for the timely launching and dropping thereof, respectively, in response thereto.

5. The invention of claim 1 further characterized by means disposed between said weapons carrier submarine vehicle towing means and said weapons carrier submarine vehicle for searching for and indicating the presence of said target object and the sea floor zone in which it is laying prior to the firing of said one rocket or drop charge.

6. A submarine mine neutralization system comprising in combination:
    a towing vehicle;
    a sonar and readout system mounted on said towing vehicle;
    a manually triggered fire control system mounted on said towing vehicle and connected to said sonar and readout system for timely enabling thereby after the manual trigger thereof;
    a forward-towed altitude-controlled submarine vehicle connected to the aforesaid towing vehicle in such manner as to be towed thereby a predetermined distance therefrom;
    first sonar means disposed on said forward-towed submarine vehicle for locating target objects laying on the sea floor within predetermined zones abeam thereof, said sonar means being connected to the aforesaid sonar and readout system mounted on said towing vehicle for readout of the located target objects;
    an aft-towed submarine vehicle connected to said forward towed vehicle in such manner as to be towed thereby a predetermined distance therefrom;

means mounted on said aft-towed submarine vehicle for controlling the altitude it runs above the sea floor as it is being towed by the aforesaid forward-towed vehicle;

second sonar means disposed on said aft-towed submarine vehicle for acquiring the target objects laying within said predetermined zones on the sea floor located by the aforesaid first sonar means as they arrive at a substantially abeam position therewith, said second sonar means likewise being connected to the aforesaid sonar and readout system mounted on said towing vehicle for readout of the acquired target objects; and a plurality of weapons, respectively capable of being aimed and fired at said predetermined zones on said sea floor, mounted in said aft-towed submarine vehicle, said plurality of weapons being connected to the output of the aforesaid manually triggered fire control system for being timely fired thereby.

7. The device of claim 6 wherein the manually triggered fire control system mounted on said towing vehicle and connected to said sonar and readout system for timely enabling thereby after the manual trigger thereof comprises:

an operator's console;

a standby weapon firing panel, having a plurality of standby firing keys, mounted on said console;

a weapon firing panel mounted on said console having a plurality of weapon firing keys respectively connected to the aforementioned standby firing keys for the disabling thereof when one of said weapon firing keys is triggered;

a fire control computer having a plurality of inputs and a plurality of outputs, with one of the inputs thereof connected to an output of said sonar and readout system and with the remainder of the inputs thereof respectively connected to the keys of said weapon firing panel, and with the outputs thereof respectively connected to the aforesaid plurality of weapons for the timely ignition and launching thereof.

8. The invention of claim 6 further characterized by means mounted on said aft-towed submarine vehicle, connected to the aforesaid sonar and readout system, and effectively connected to the aforesaid fire control system mounted on said towing vehicle, for measuring the velocity of said aft-towed submarine vehicle as the aforesaid target objects laying on the sea floor are acquired, and for effecting the delay of the firing of said weapons by said fire control system an amount of time proportional to said aft-towed submarine vehicle velocity, thereby placing the aforesaid target objects substantially abeam of said weapons at the instant they are fired.

9. The device of claim 6 wherein said plurality of weapons includes a plurality of underwater rockets and drop charges, each of which contains an explosive warhead.

10. The invention according to claim 9 further characterized by a fuze disposed in each of said plurality of underwater rockets and drop charges for delaying the detonation of the warhead thereof a predetermined time after the firing thereof.

* * * * *